(12) United States Patent  (10) Patent No.: US 9,325,162 B2
Moss  (45) Date of Patent: Apr. 26, 2016

(54) GANGED ELECTRICAL FITTINGS WITH INTEGRAL COVER PLATE AND METHOD OF USE THEREOF

(71) Applicant: J Moss, Roswell, GA (US)

(72) Inventor: J Moss, Roswell, GA (US)

( * ) Notice: Subject to any disclaimer, the term of this patent is extended or adjusted under 35 U.S.C. 154(b) by 0 days.

(21) Appl. No.: 14/686,251

(22) Filed: Apr. 14, 2015

(65) Prior Publication Data

US 2015/0222105 A1  Aug. 6, 2015

Related U.S. Application Data

(63) Continuation-in-part of application No. 14/603,641, filed on Jan. 23, 2015, which is a continuation of application No. 14/546,515, filed on Nov. 18, 2014, which is a continuation of application No. 13/460,060, filed on Apr. 30, 2012, now Pat. No. 8,921,694.

(51) Int. Cl.

| | |
|---|---|
| *H02G 3/16* | (2006.01) |
| *H05K 5/00* | (2006.01) |
| *H05K 13/04* | (2006.01) |
| *H02G 3/14* | (2006.01) |
| *H02G 3/10* | (2006.01) |
| *H02G 3/08* | (2006.01) |
| *H02G 3/12* | (2006.01) |

(52) U.S. Cl.
CPC ............. *H02G 3/14* (2013.01); *H02G 3/081* (2013.01); *H02G 3/10* (2013.01); *H02G 3/123* (2013.01); *H02G 3/16* (2013.01); *H02G 3/12* (2013.01); *Y10T 29/49194* (2015.01)

(58) Field of Classification Search
CPC .......... H02G 3/08; H02G 3/16; H02G 3/086; H02G 3/081; H02G 3/14; H05K 5/00; H05K 5/02; H05K 5/03; H01R 13/46; H01R 13/506; H01R 13/50; H01R 13/58; H01R 13/5804; H01R 13/5812; Y10T 29/49194
USPC ............. 174/480, 481, 50, 53, 57, 58, 66, 67, 174/503; 220/3.2–3.9, 241, 242; 439/535, 439/536, 449, 405, 392, 650; 248/49, 68.1
See application file for complete search history.

(56) References Cited

U.S. PATENT DOCUMENTS

| | | | | |
|---|---|---|---|---|
| 3,879,101 | A * | 4/1975 | McKissic | 439/535 |
| 4,165,443 | A * | 8/1979 | Figart et al. | 174/53 |
| 6,870,099 | B1 * | 3/2005 | Schultz et al. | 174/53 |
| 6,937,461 | B1 * | 8/2005 | Donahue, IV | 174/50 |
| 6,939,179 | B1 * | 9/2005 | Kieffer et al. | 439/650 |
| 7,425,677 | B2 * | 9/2008 | Gates et al. | 174/50 |
| 7,497,273 | B2 * | 3/2009 | Schoettle | 173/53 |
| 8,575,484 | B1 * | 11/2013 | Witherbee | 174/58 |

* cited by examiner

*Primary Examiner* — Angel R Estrada
(74) *Attorney, Agent, or Firm* — Mathew L. Grell; Grell & Watson Patent Attorneys

(57) ABSTRACT

A ganged electrical fitting having an integral cover plate and two or more electrical components, such as a switch, a receptacle, an outlet, a fan switch, a dimmer and combinations thereof, the ganged electrical component/cover plate being secured via screws through the cover plate into a wall box. Electrical component wires are secured to power wires coming from the wall box via quick-connectors or wirenuts.

18 Claims, 8 Drawing Sheets

GANGED ELECTRICAL FITTINGS WITH INTEGRAL COVER PLATE AND METHOD OF USE THEREOF

CROSS-REFERENCE TO RELATED APPLICATIONS

To the full extent permitted by law, the present United States Non-provisional Patent Application, is a Continuation-in-Part of, Continuation United States Non-provisional Application entitled "Electrical Fittings with Integral Cover Plate and Method of Use Thereof," having assigned Ser. No. 14/603,641, filed on Jan. 23, 2015, which claims benefit of Continuation United States Non-provisional Application entitled "Electrical Fittings with Integral Cover Plate and Method of Use Thereof," having assigned Ser. No. 14/546,515, filed on Nov. 18, 2014, which claims benefit of United States Non-provisional Application entitled "Electrical Fittings with Integral Cover Plate and Method of Use Thereof," having assigned Ser. No. 13/460,060, filed on Apr. 30, 2012, incorporated herein by reference in its entirety.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to electrical fittings or fixtures, and more specifically to electrical fittings or fixtures having an integral cover plate.

2. Description of Related Art

During construction of buildings, both commercial and residential, it is common to provide an electrical wall box for receiving an electrical fitting, such as, an outlet or a switch. The electrical wall box is typically secured to the side of a vertical stud. Once the wall box is installed, wallboard is typically installed over the studs and an opening is cut in the wallboard in order to pass the electrical fitting through the wallboard. Often, the opening is cut prior to installation of the wall box and the wall box is secured to align with the opening. Electrical wiring from a power source enters the wall box via an opening therein, wherein the electrical wiring is accessible from the front of the wall box.

To complete the installation of the electrical fitting, wires from the fitting are secured to corresponding wires in the wall box, such as, via wire nuts, and the fitting is secured, typically via screws that engage tubular openings (threaded or unthreaded—for self-tapping screws) in the wall box. Subsequently, a decorative cover plate is installed over the fitting, by securing the cover plate, such as, via screws that engage threaded openings in the fitting.

Whenever a building is undergoing renovation, the existing wall fittings and their cover plates are often in need of replacement or may simply need to be replaced to provide a different appearance. Further, it is often necessary to replace a single, defective fitting.

In order to replace such existing fittings, once the old cover plates and fittings are removed, typically a new fitting is installed by securing the wires of the new fitting to their corresponding wires in the wall box (step one), securing the fitting to the wall box (step two), and, subsequently, securing a new cover plate over the replaced fitting (step three). All of these steps are labor intensive, resulting in higher costs than would otherwise be incurred through a simpler apparatus and method of installation. Moreover, stock keeping units must be maintained for both the fittings and the cover plates, thereby increasing record-keeping costs for inventory.

When installing an electrical fitting to a wall box, the fitting has openings for fasteners to engage the wall box receiving apertures. Once the fitting is installed, the cover plate is secured via fasteners through different openings, thus requiring both different locations for the openings that receive the fasteners, but more importantly, a larger number of openings that should be required.

Therefore, it is readily apparent that there is a need for an electrical fitting and cover plate combination that reduces the typical three step installation to a wired wall box from three steps to two.

BRIEF SUMMARY OF THE INVENTION

Briefly described, in a preferred embodiment, the present invention overcomes the above-mentioned disadvantages and meets the recognized need for such a device by providing an electrical fitting, such as, for exemplary purposes only and without limitation, an electrical outlet or an electrical switch, wherein the electrical fitting comprises an integral cover plate, and wherein the composite electrical fitting/cover plate is secured via screws through the cover plate into the wall box, thereby reducing inventory for parts suppliers and labor costs for installation.

According to its major aspects and broadly stated, the present invention in its preferred form is a composite electrical fitting comprising an electrical component having an integrally-formed cover plate, the electrical component and cover plate comprising a single unit. The composite electrical fitting is dimensioned to be received by a wall box, the wall box having apertures dimensioned to cooperatively engage fasteners. The cover plate has one or more openings therein that are dimensioned to receive fasteners. Preferably, the composite electrical fitting is removably secured to the wall box via the fasteners.

The electrical component has integral wires, each having a first end and a second end, with the first end in electrical communication with the electrical component, and each wire of the electrical component has a quick-connect member disposed at the second end thereof. The quick-connect member comprises a gripping member dimensioned to secure an electrical conductor therewithin. The electrical conductor typically comprises a sheath therearound, and the quick-connect member has a cutting member dimensioned to pierce the sheath.

The electrical component may comprise an electrical outlet having one or more receptacles for receiving electrical plugs, and/or may comprise an electrical switch. Preferably, the electrical component comprises two receptacles. Alternatively, the electrical component comprises four receptacles.

In the course of either an initial installation or for remodeling, an electrical fitting/cover plate combination is obtained and each of its wires is secured to a corresponding wire coming out of the electrical wall box via the quick-connect member which pierces the insulating sheath of the wire coming from the wall box. Subsequently, the electrical fitting/ cover plate combination is secured to the electrical wall box by passing one or more fasteners through the openings in the cover plate and engaging the fasteners cooperatively with receiving apertures in the wall box.

More specifically, the present invention is a composite electrical fitting having an electrical component and a cover plate that are integrally formed together. The electrical component comprises for exemplary purposes only, an outlet or a switch which is installed in a wall section.

Typically, the wall section has an opening cut therein to allow access to electrical wall boxes from outside of the wall. The wall box is typically secured to a selected stud within the wall via a nail or a screw. The wall box has apertures for receiving screws to retain an electrical component therein and has an opening in the rear, sides or top of wall box to permit power supply wiring comprising a group of insulated conductors to pass into the wall box. The insulated conductors comprise conductors with insulating sheaths surrounding the conductors to insulate them.

The cover plate of the composite electrical fitting comprises throughholes dimensioned to receive fasteners inserted therethrough. The electrical component comprises, preferably, a duplex outlet having wires extending therefrom, such as, for exemplary purposes only, a hot wire, a neutral wire and a ground wire. The hot wire, the neutral wire and the ground wire each have a first end and a second end. The duplex outlet further comprises an upper receptacle and a lower receptacle, both dimensioned to receive electrical plugs for lamps, appliances or similar. The upper receptacle and lower receptacle are connected in parallel so that a single set of wires exits the duplex outlet.

At that end of the wires from the electrical component, there are quick-connectors that have gripping members to secure a wire therein and/or cutting members to pierce the insulation sheath of the insulated conductors disposed therein to provide electrical communication between the conductor and the electrical component. In an alternative embodiment, the composite electrical fitting may not have quick-connectors, but, instead, is connected to power supply wires coming from the wall box via wirenuts.

To install the composite electrical fitting, the hot wire from the mains coming from the wall is inserted into a quick-connect member on the hot wire of the electrical component, the wall neutral wire is inserted into a quick-connect member on the neutral wire of the electrical component, and the wall ground wire is inserted into a quick-connect member on the ground wire of the electrical component. Subsequently, the composite electrical fitting is secured to the wall box via one or more fasteners, with the cover plate covering the wall box opening.

In an alternate embodiment, the electrical component may comprise a switch, and, in another alternate embodiment, the electrical component may comprise a quad outlet with its receptacles wired in parallel.

In an exemplary embodiment of the ganged electrical fitting, the ganged electrical fitting includes a cover plate having at least two sets of apertures, the at least two sets of apertures includes at least one throughhole and at least one component aperture, two or more electrical components affixed to the cover plate, each of the two or more electrical components fitted therein the at least one component aperture in the cover plate, integral wires, the integral wires having a neutral wire, a ground wire and at least one hot wire, the neutral wire having a first neutral end and a second neutral end, wherein the second neutral end is in electrical communication with each of the two or more electrical components and the ground wire having a first ground end and a second ground end, wherein the second ground end is in electrical communication with each of the two or more electrical components, and wherein the at least one hot wire having a first hot wire end and a second hot wire end, wherein the second hot wire end is in electrical communication with at least one of the two or more electrical components, an electrical component cover affixed to the cover plate, the electrical component cover fitted around the two or more electrical components.

In a further exemplary embodiment the ganged electrical fitting, the ganged electrical fitting includes a cover plate having at least two sets of apertures, the at least two sets of apertures includes at least one throughhole and at least one component aperture, two or more electrical components affixed to the cover plate, each of the two or more electrical components selected from a group consisting of a switch, a receptacle, an outlet, a fan switch, a dimmer and combinations thereof, each of the two or more electrical components fitted therein the at least one component aperture in the cover plate, integral wires, the integral wires having a neutral wire, a ground wire and at least one hot wire, the neutral wire having a first neutral end and a second neutral end, wherein the second neutral end is in electrical communication with each of the two or more electrical components and the ground wire having a first ground end and a second ground end, wherein the second ground end is in electrical communication with each of the two or more electrical components, and wherein the at least one hot wire having a first hot wire end and a second hot wire end, wherein the second hot wire end is in electrical communication with at least one of the two or more electrical components, an electrical component cover affixed to the cover plate, the electrical component cover fitted around the two or more electrical components.

Accordingly, a feature and advantage of the present invention is its ability to reduce labor costs for initial installation and for retrofitting of electrical fittings.

Another feature and advantage of the present invention is its ability to reduce the number of stock keeping units for inventory purposes.

Still another feature and advantage of the present invention is its ability to be quickly installed.

Yet another feature and advantage of the present invention is its ability to be utilized with a variety of electrical components.

Yet still another feature and advantage of the present invention is that it requires only simple tools for installation.

Still yet another feature and advantage of the present invention is that it is secured via fewer fasteners that is required by typical electrical fixtures with separate cover plates.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATE EMBODIMENTS OF THE INVENTION

In describing the preferred and selected alternate embodiments of the present invention, as illustrated in FIGS. 1-9, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
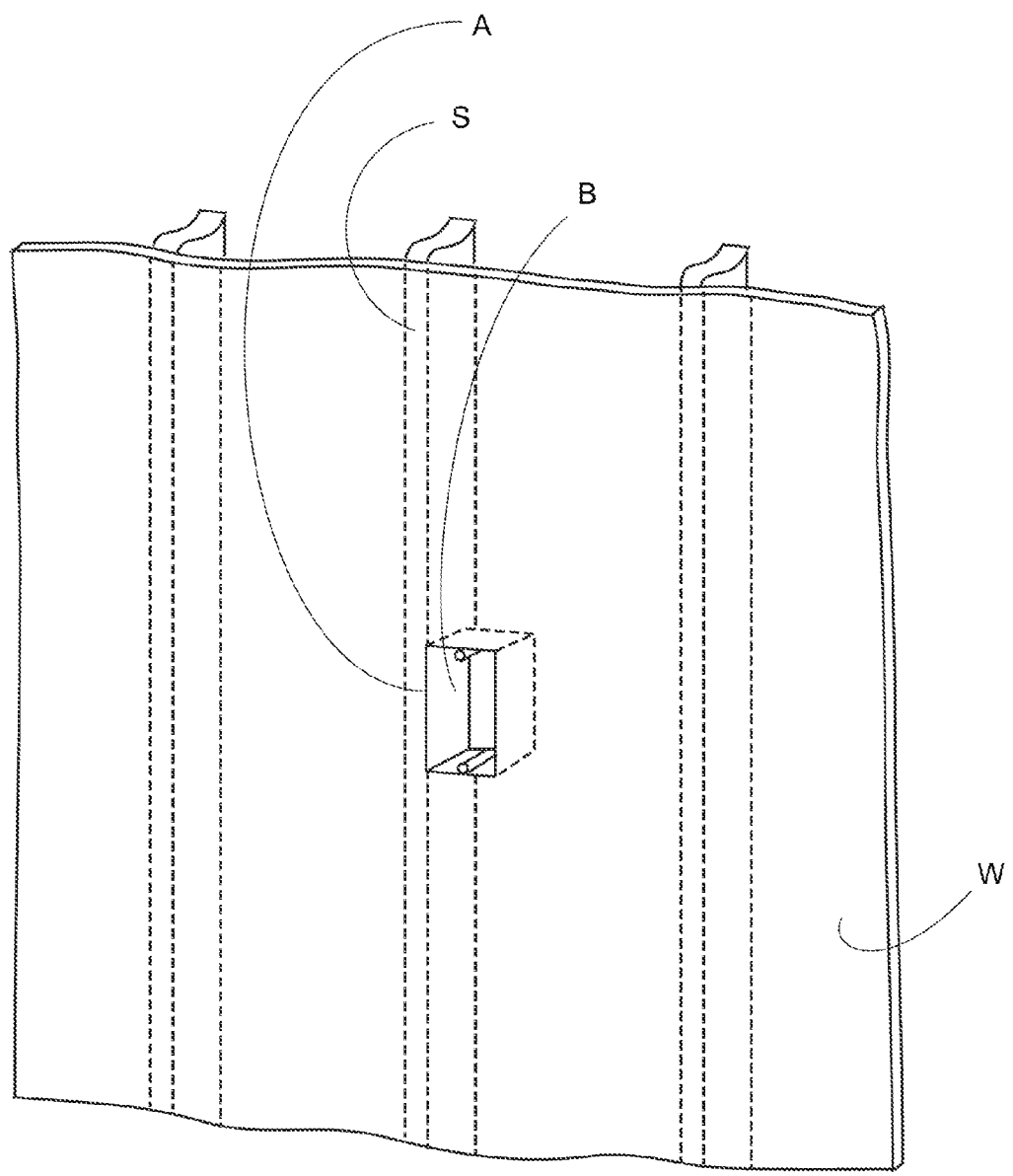
FIG. 1 is a perspective view of a wall section having an electrical wall box installed therein.
Figure 2A:
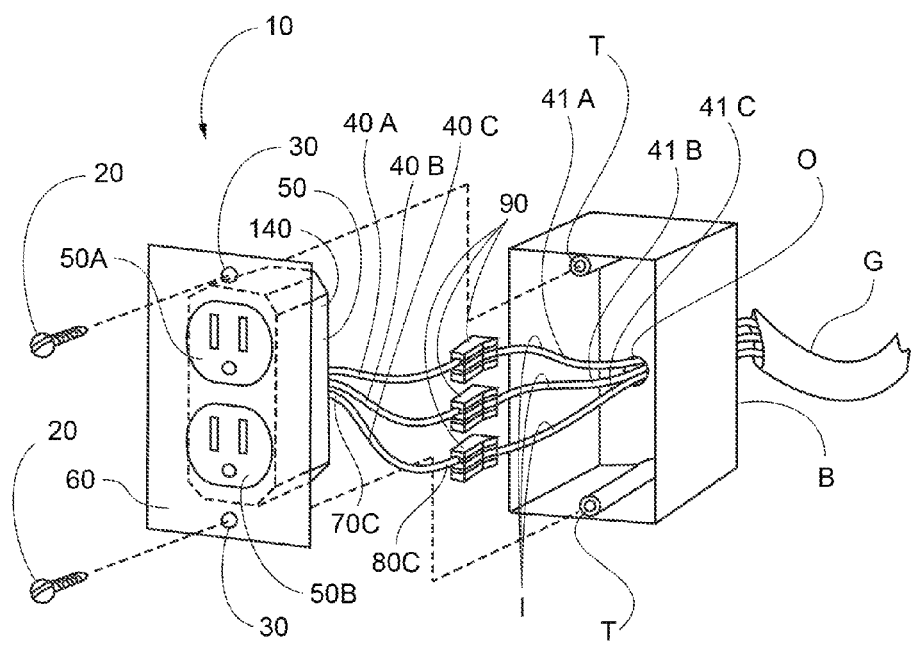
FIG. 2A is a front exploded perspective view of an electrical fitting according to a preferred embodiment, shown connected and secured to an existing electrical wall box.
Figure 3:
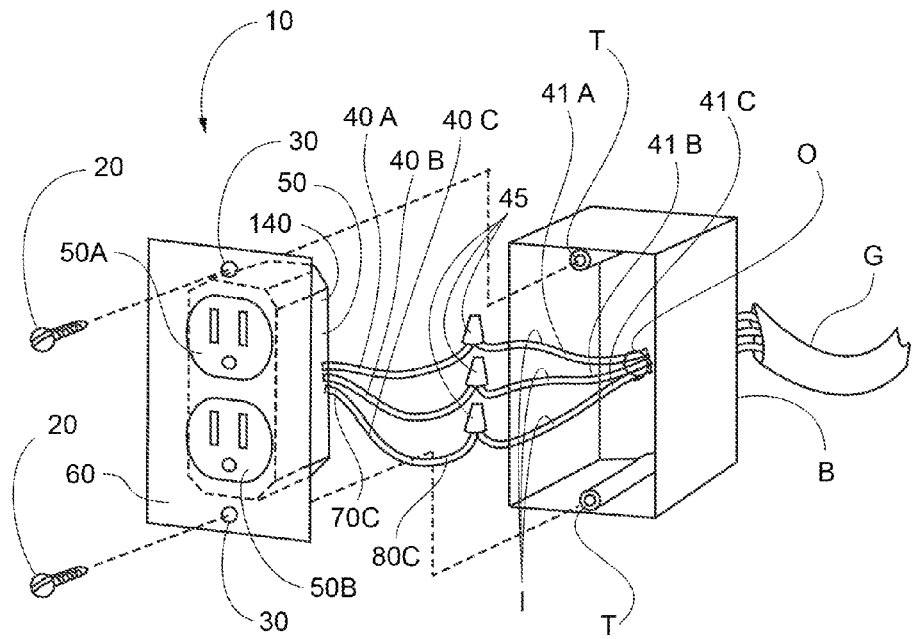
FIG. 3 is a front exploded perspective view of an electrical fitting according to a preferred embodiment, shown connected and secured to an existing electrical wall box.

Referring now to FIGS. 1-3, the present invention in a preferred embodiment comprises composite electrical fitting 10 (best shown in FIG. 2A), wherein composite electrical fitting 10 comprises electrical component 50 and cover plate 60, wherein electrical component 50 and cover plate 60 are integrally formed.

Turning now to FIG. 1, depicted therein is wall W, having studs S therewithin. An opening A is preferably cut in wall W, wherein opening A is dimensioned to allow access to interior of wall box B from outside of wall W. Wall box W is secured to a selected stud S via fasteners as are known in the art. Wall box B comprises receiving apertures T for receiving fasteners, such as, for exemplary purposes only, fasteners 20 discussed hereinbelow and wall box B further comprises opening O, typically in the rear of wall box B, or alternatively in a side or top of wall box B. Power supply wiring G comprises a group of insulated conductors I, wherein power supply wiring G passes through opening O in wall box B and is accessible from within wall box B (best shown in FIGS. 2C and 3). Insulated conductors I comprise conductors C and sheaths H, wherein sheaths H surround conductors C thereby insulating same.

Figure 2C:
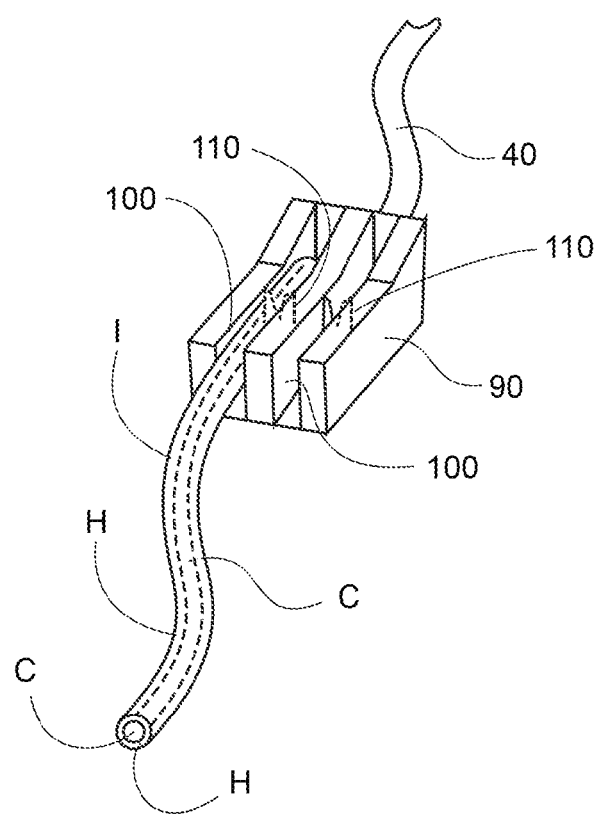
FIG. 2C is a detail perspective view of a wire from an electrical fitting according to the preferred embodiment, shown with a quick-connect used to join to another wire.
Figure 2B:
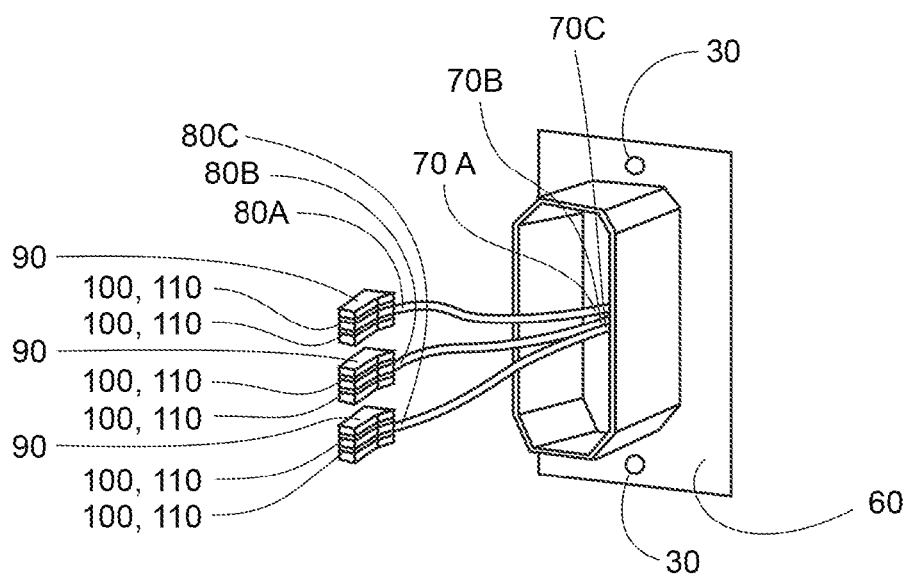
FIG. 2B is a rear perspective view of an electrical fitting according to the preferred embodiment.

Referring now to FIGS. 2A and 2B, cover plate 30 of composite electrical fitting 10 comprises throughholes 30, wherein throughholes 30 are dimensioned to receive fasteners 20 therethrough. Electrical component 50 comprises duplex outlet 140 and wires 40, wherein wires 40 comprise hot wire 40A, neutral wire 40B and ground wire 40C. Hot wire 40A comprises first end 70A and second end 80A, neutral wire 40B comprises first end 70B and second end 80B, and ground wire 40C comprises first end 70C and second end 80C. Duplex outlet 140 comprises upper receptacle 50A and lower receptacle 50B, wherein upper receptacle 50A and lower receptacle 50B are dimensioned to receive an electrical plug connected to, for exemplary purposes only, a lamp or an appliance, and wherein upper receptacle 50A and lower receptacle 50B are connected in parallel, and wherein first ends 70A, 70B and 70C are in electrical communication with upper receptacle 50A and lower receptacle 50B.

Turning now more particularly to FIG. 2C, composite electrical fitting 10 further comprises quick-connectors 90, wherein quick-connectors 90 are disposed at second ends 80A, 80B and 80C, and wherein quick-connectors 90 comprise gripping members 100 and/or cutting members 110, wherein gripping members 100 are dimensioned to grip a selected size of wire and wherein cutting members 110 are dimensioned to cut through sheath H surrounding conductor C of insulated conductor I, thereby providing electrical communication between conductor C and a selected one of second ends 80A, 80B and 80C.

In another preferred embodiment as depicted in FIG. 3, composite electrical fitting 10 does not have quick-connectors 90 installed and, instead, connection between second ends 80A, 80B, 80C and respective wall hot wire 41A, wall neutral wire 41B, and wall ground wire 41C of wiring G is made via use of wirenuts 45, as is known in the art.

To install, wall hot wire 41A comprising insulated conductor I is inserted into quick-connect member disposed at second end 80A of hot wire 40A, wall neutral wire 41B comprising insulated conductor I is inserted into quick-connect member disposed at second end 80B of neutral wire 40B, and wall ground wire 41C comprising insulated conductor I is inserted into quick-connect member 90 disposed at second end 80C of ground wire 40C. Subsequently, composite electrical fitting 10 is secured to an existing wall box B (best shown in FIG. 3), wherein electrical component 50 is dimensioned to be received within wall box B, and wherein cover plate 60 is dimensioned to cover wall box B. Fasteners 20 are inserted through throughholes 30 and engage receiving apertures T.

Figure 4:
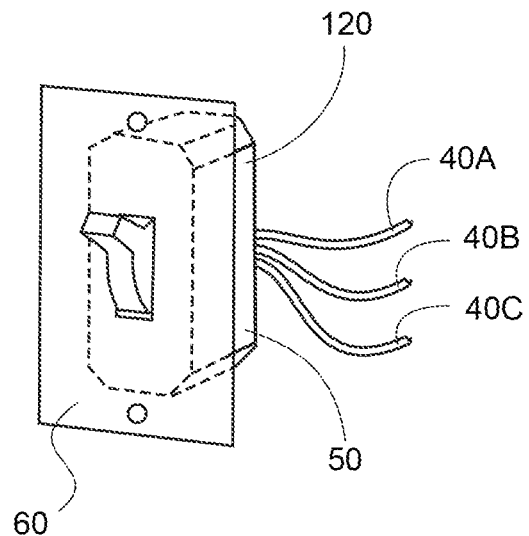
FIG. 4 is a front perspective view of an electrical fitting according to an alternate embodiment.

Referring now more specifically to FIG. 4, illustrated therein is an alternate embodiment of composite electrical fitting 10, wherein the alternate embodiment of FIG. 4 is substantially equivalent in form and function to that of the preferred embodiment detailed and illustrated in FIGS. 1-3 except as hereinafter specifically referenced. Specifically, in the embodiment of FIG. 4, electrical component 50 comprises switch 120, wherein switch 120 is substituted for duplex outlet 140, and wherein switch 120 comprises all of the components of FIGS. 2A and 2B other than duplex outlet 140.

Figure 5:
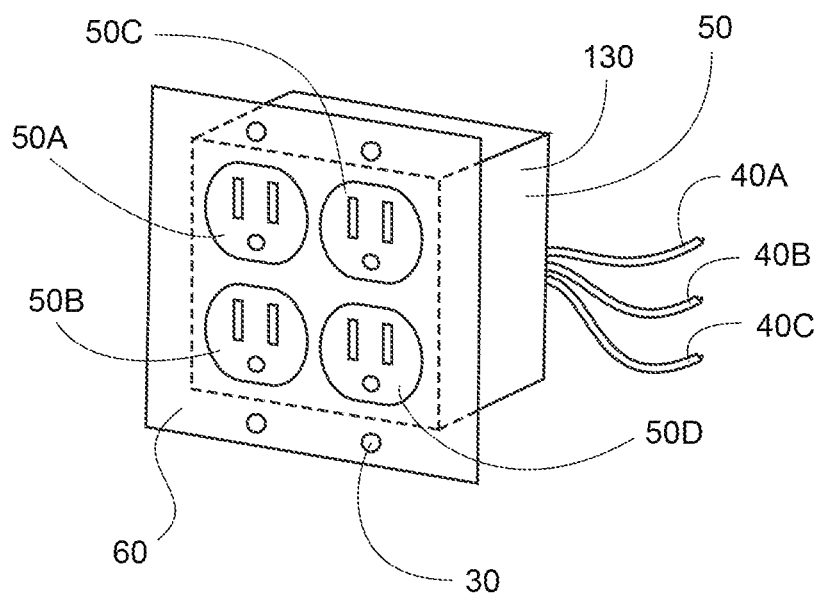
FIG. 5 is a front perspective view of an electrical fitting according to an alternate embodiment.

Referring now more specifically to FIG. 5, illustrated therein is an alternate embodiment of composite electrical fitting 10, wherein the alternate embodiment of FIG. 5 is substantially equivalent in form and function to that of the preferred embodiment detailed and illustrated in FIGS. 1-3 except as hereinafter specifically referenced. Specifically, in the embodiment of FIG. 5, electrical component 50 comprises quad outlet 120, wherein quad outlet 130 comprises upper receptacles 50A, 50C and lower receptacles 50B, 50D, and wherein receptacles 50A, 50B, 50C and 50D are wired in parallel. Other than duplex outlet 140, the alternative embodiment of FIG. 5 comprises all of the components of FIGS. 2A and 2B.

Figure 6:
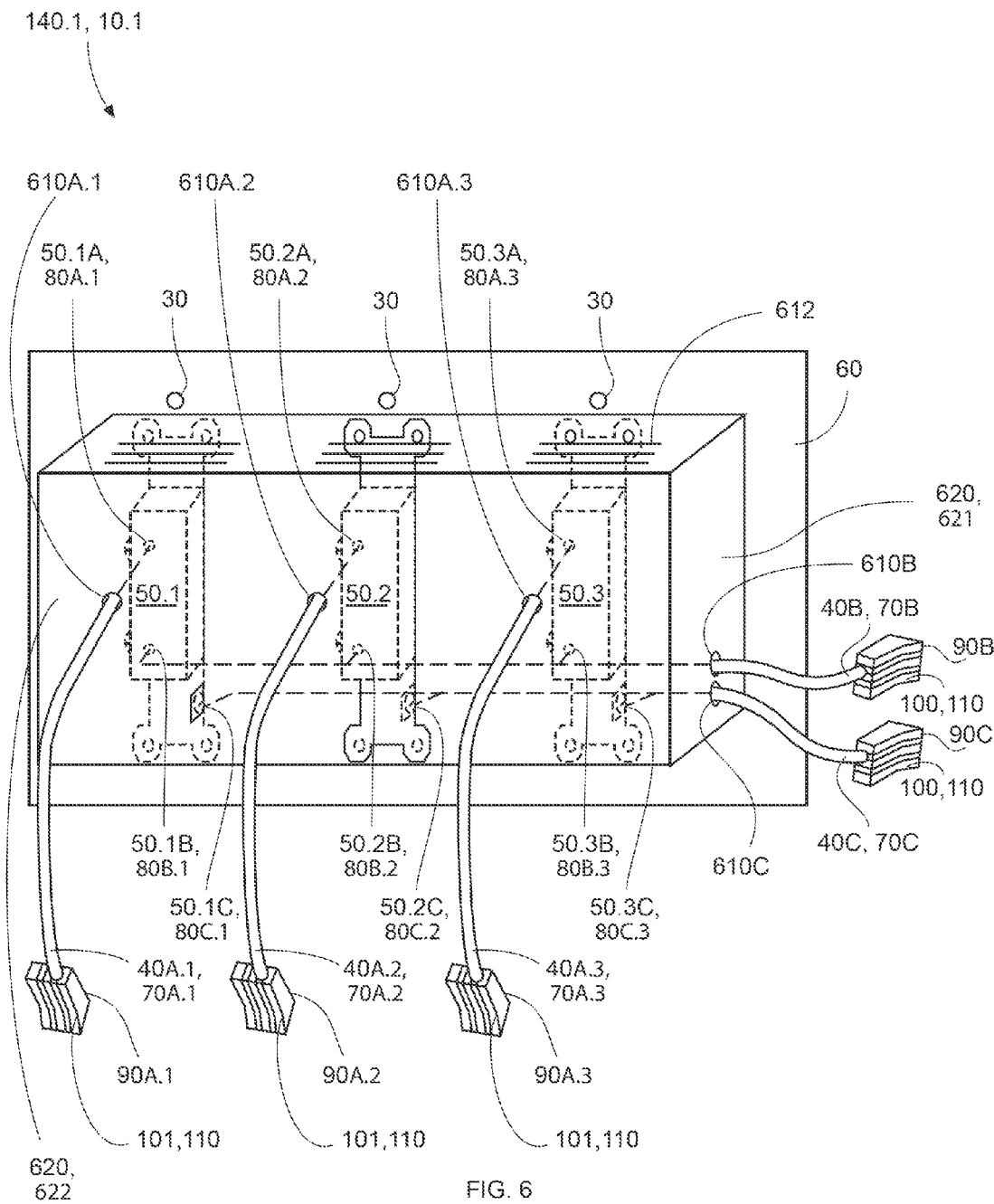
FIG. 6 is a back perspective view of a ganged electrical switch fitting according to an alternate embodiment.

Referring now to FIG. 6, cover plate 60 of ganged composite electrical fitting 10.1 preferably includes throughholes 30, wherein throughholes 30 are dimensioned to receive fasteners 20 therethrough. One or more electrical components, such as 50.1, 50.2, 50.3 are configured as ganged duplex switch 140.1 and wires 40, wherein wires 40 includes one or more hot wire 40A, one or more neutral wire 40B and one or more ground wire 40C. Preferably hot wire 40A.1, 40A.2, 40A.3, respectively, for electrical switch component 50.1, 50.2, 50.3, includes first end 70A.1, 70A.2, 70A.3 (first hot ends) and second end 80A.1, 80A.2, 80A.3, (second hot ends) electrically connected to electrical component 50 via hot terminal 50.1A, 50.2A, 50.3A of electrical switch component 50.1, 50.2, 50.3, respectively. Moreover, neutral wire 40B preferably includes first end 70B (first neutral end) and serial second end 80B.1, 80B.2, 80B.3 (second neutral ends), electrically connected to each electrical component 50 via neutral terminal 50.1B, 50.2B, 50.3B of electrical component 50.1, 50.2, 50.3, respectively, and ground wire 40C preferably includes first end 70C (first ground end) and serial second end 80C.1, 80C.2, 80C.3 (second ground ends), electrically connected to each electrical component 50 via ground terminal 50.1C, 50.2C, 50.3C of electrical component 50.1, 50.2, 50.3, respectively. Duplex outlet 140.1 includes electrical switch components 50.2, 50.3 connected in parallel, wherein neutral wire 40B and ground wire 40C are in parallel electrical communication with electrical switch components 50.1, 50.2, 50.3.

Furthermore, cover plate 60 of composite electrical fitting 10.1 preferably includes an electrical component cover, such as back cover 620 configured to cover, fitted around, encase, and insulate electrical switch components 50.1, 50.2, 50.3, including hot terminal 50.1A, 50.2A, 50.3A, neutral terminal 50.1B, 50.2B, 50.3B and/or ground terminal 50.1C, 50.2C, 50.3C of electrical component 50.1, 50.2, 50.3. Preferably back cover 620 includes one or more holes, such as aperture 610 to enable wires 40 to transition in and out of back cover 620. More specifically, hot wire 40A.1, 40A.2, 40A.3 for electrical switch component 50.1, 50.2, 50.3, respectively, enters back cover 620 via apertures 610A.1, 610A.2, 610A.3, and neutral wire 40B for electrical receptacle component 50.1, 50.2, 50.3, respectively and ground wire 40C for electrical receptacle component 50.1, 50.2, 50.3, respectively enter back cover 620 via apertures 610B and 610C, respectively. Furthermore, back cover 620 further includes one or more vents 612 configured to enable heat generated by electrical switch components 50.1, 50.2, 50.3 to dissipate heat therefrom back cover 620 and/or composite electrical fitting 10.1.

Preferably, electrical fitting 10 further comprises quick-connectors 90, wherein quick-connectors 90 are disposed at first end 70A.1, 70A.2, 70A.3, 70B, and 70C, hot, neutral, ground, respectively, and wherein quick-connectors 90 comprise gripping members 100 and/or cutting members 110, wherein gripping members 100 are dimensioned to grip a selected size of wire and wherein cutting members 110 are dimensioned to cut through sheath H surrounding conductor C of insulated conductor I, thereby providing electrical communication between conductor C and a selected one of first end 70A.1, 70A.2, 70A.3, 70B, and 70C via wall hot wire 41A, such as 41A.1, 41A.2, 41A.3, wall neutral wire 41B and wall ground wire 41C.

It is contemplated herein that wall hot wire 41A, wall neutral wire 41B and wall ground wire 41C may supply a variety of currents and voltages to electrical switch components 50.1, 50.2, 50.3. 50.4 in wall box B, including standard power supplies meeting U.L., U.S. and foreign standard or requirements, such as 110V/120V, 220V/240V and the like.

Preferably, back cover 620 includes four side panels 621 and rear panel 622 configured in the shape of a rectangular box or the like shape configured to covered or insulated ganged duplex switches 140.1. Preferably apertures 610, such as apertures 610A, 610B and 610C may be positioned therein any of four side panels 621 or rear panel 622 to enable close proximity of quick-connectors 90, such as apertures 90A.1, 90A.2, 90A.3, 90B and 90C thereto insulated conductors I of power supply wiring G, such as wall hot wire 41A, such as 41A.1, 41A.2, 41A.3, wall neutral wire 41B, and wall ground wire 41C, respectively of wall box B of FIG. 3. Preferably back cover 620 may be affixed or removeably affixed thereto cover plate 60, such as by fastener, latch, adhesive, sonic weld or the like to form a covered and/or insulated ganged duplex switches 140.1 to increase the safety and to simplify wiring a set of electrical switch components 50.1, 50.2, 50.3 in wall box B.

Figure 7:
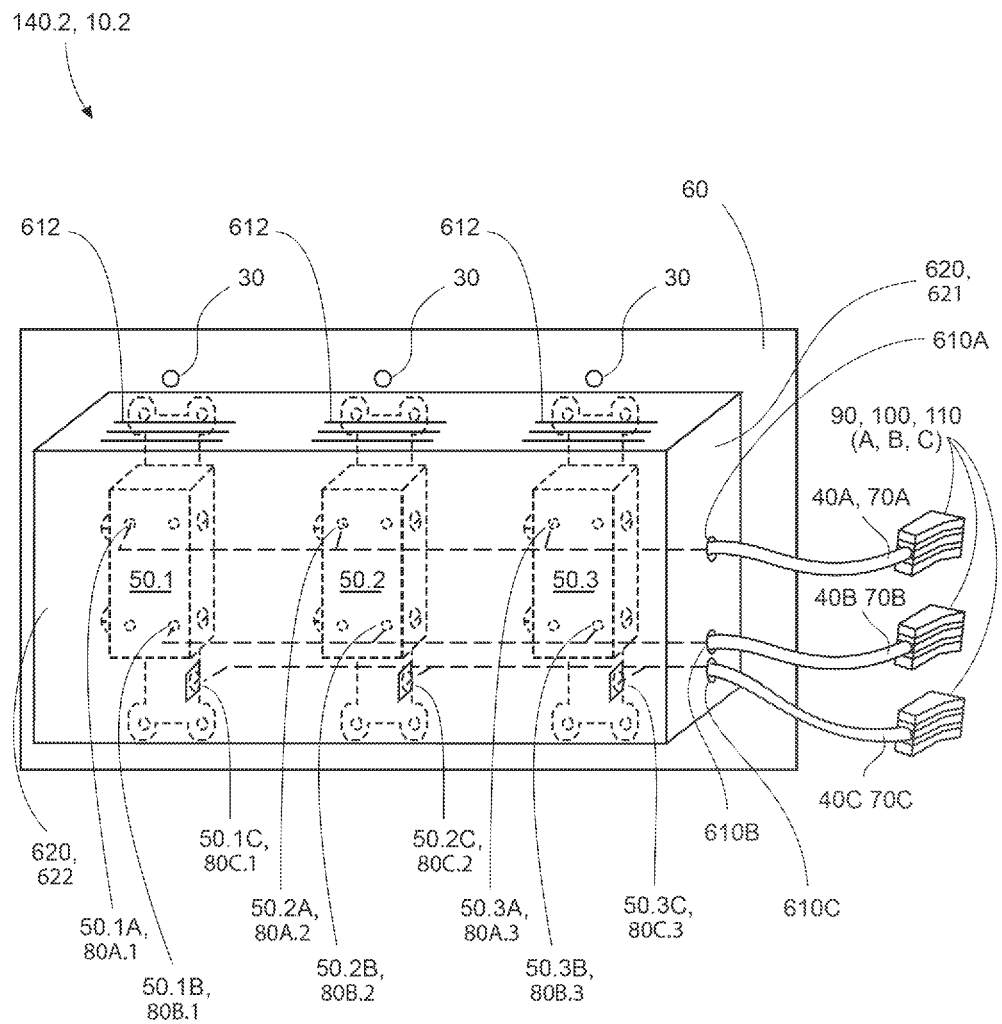
FIG. 7 is a back perspective view of an electrical receptacle fitting according to an alternate embodiment.

Referring now to FIG. 7, cover plate 60 of ganged composite electrical fitting 10.2 preferably includes throughholes 30, wherein throughholes 30 are dimensioned to receive fasteners 20 therethrough. One or more electrical receptacle components, such as 50.1, 50.2, 50.3 are configured as ganged duplex receptacle 140.2 and wires 40, wherein wires 40 includes one or more hot wire 40A, one or more neutral wire 40B and one or more ground wire 40C. Preferably hot wire 40A for electrical receptacle component 50.1, 50.2, 50.3, includes first end 70A (first hot end) and serial second end 80A.1, 80A.2, 80A.3 (second hot ends) electrically connected to each electrical receptacle component 50.1, 50.2, 50.3 via hot terminal 50.1A, 50.2A, 50.3A of electrical component 50.1, 50.2, 50.3, respectively. Moreover, neutral wire 40B preferably includes first end 70B (first neutral end) and serial second end 80B.1, 80B.2, 80B.3 (second neutral ends), electrically connected to each electrical component 50 via neutral terminal 50.1B, 50.2B, 50.3B of electrical component 50.1, 50.2, 50.3, respectively, and ground wire 40C preferably includes first end 70C (first ground end) and serial second end 80C.1, 80C.2, 80C.3 (second ground ends), electrically connected to each electrical component 50 via ground terminal 50.1C, 50.2C, 50.3C of electrical component 50.1, 50.2, 50.3, respectively. Duplex outlet 140.2 includes electrical receptacle components 50.1, 50.2, 50.3 connected in parallel, wherein hot wire 40A, neutral wire 40B, and ground wire 40C are in parallel electrical communication with electrical switch components 50.1, 50.2, 50.3.

Furthermore, cover plate 60 of composite electrical fitting 10.2 preferably includes electrical component cover, such as back cover 620 configured to cover and insulate electrical receptacle components 50.1, 50.2, 50.3, including hot terminal 50.1A, 50.2A, 50.3A, neutral terminal 50.1B, 50.2B, 50.3B and/or ground terminal 50.1C, 50.2C, 50.3C of electrical component 50.1, 50.2, 50.3. Preferably back cover 620 includes one or more holes, such as aperture 610 to enable wires 40 to transition in and out of back cover 620. More specifically, hot wire 40A for electrical receptacle component 50.1, 50.2, 50.3, respectively, enters back cover 620 via apertures 610A, and neutral wire 40B for electrical receptacle component 50.1, 50.2, 50.3, respectively and ground wire 40C for electrical receptacle component 50.1, 50.2, 50.3, respectively enter back cover 620 via apertures 610B and 610C, respectively. Furthermore, back cover 620 further includes one or more vents 612 configured to enable heat generated by electrical receptacle components 50.1, 50.2, 50.3 to dissipate heat therefrom back cover 620 and/or composite electrical fitting 10.2.

Preferably, electrical fitting 10.2 further comprises quick-connectors 90, wherein quick-connectors 90 are disposed at first end 70A, 70B, and 70C and wherein quick-connectors 90 comprise gripping members 100 and/or cutting members 110, wherein gripping members 100 are dimensioned to grip a selected size of wire and wherein cutting members 110 are dimensioned to cut through sheath H surrounding conductor C of insulated conductor I, thereby providing electrical communication between conductor C and a selected one of first end 70A, 70B, and 70C via wall hot wire 41A, wall neutral wire 41B, and wall ground wire 41C.

Preferably, back cover 620 includes four side panels 621 and rear panel 622 configured in the shape of a rectangular box or the like shape configured to covered or insulated ganged duplex switches 140.2. Preferably apertures 610, such as apertures 610A, 610B and 610C may be positioned therein any of four side panels 621 or rear panel 622 to enable close proximity of quick-connectors 90, such as apertures 90A, 90B and 90C thereto insulated conductors I of power supply wiring G, such as wall hot wire 41A, wall neutral wire 41B, and wall ground wire 41C, respectively of wall box B of FIG. 3. Preferably back cover 620 may be affixed or removeably affixed thereto cover plate 60, such as by fastener, latch, adhesive, sonic weld, heat weld, or the like to form a covered and/or insulated ganged duplex switches 140.2 to increase the safety and to simplify wiring a set of electrical receptacle components 50.1, 50.2, 50.3 in wall box B.

It is contemplated herein that ganged duplex switch 140.1 and/or ganged duplex switches 140.2 may contain any mix or combination of electrical component 50, such as electrical switch component 50 and/or electrical receptacle components 50 whether switch, receptacle (pin or blade style), fan switch, dimmer, or the like and any combination thereof electrical component 50. Moreover, electrical component 50 may include electrical components meeting U.L., U.S. and foreign standard or requirements, such as 110V/120V, 220V/240V, grounded, not grounded, and the like.

Figure 8:
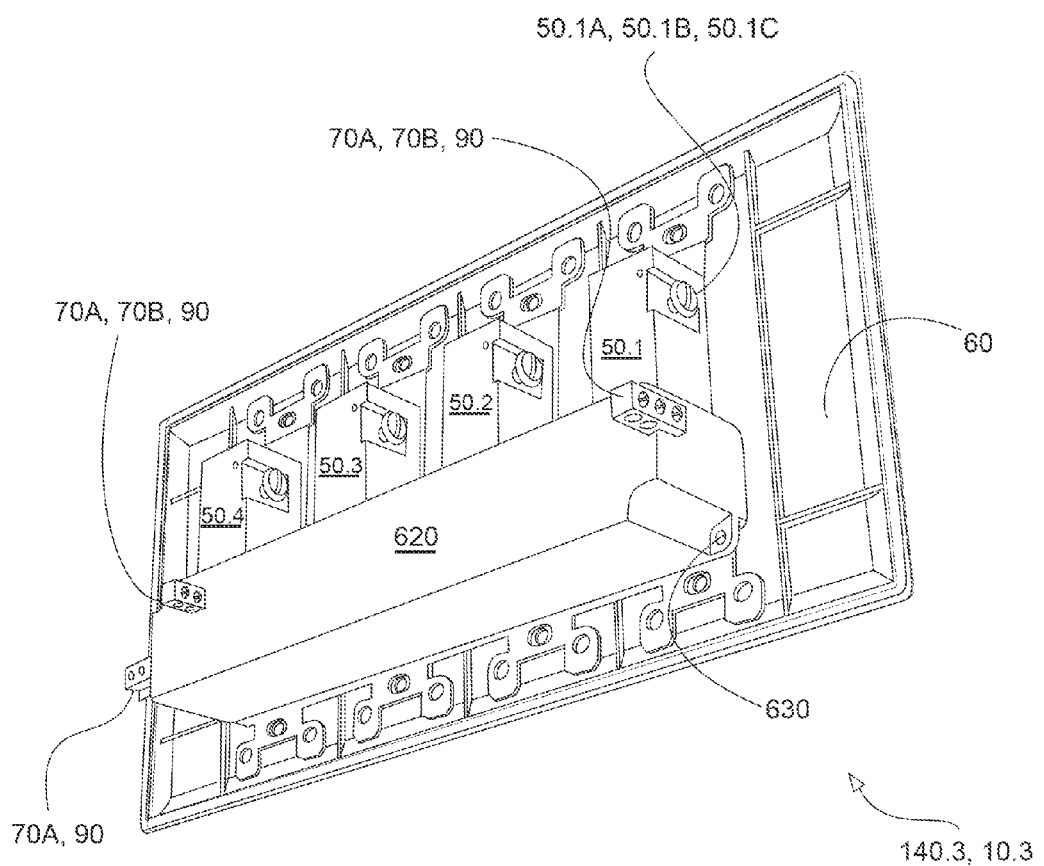
FIG. 8 is a back perspective view of a ganged electrical switch fitting having an insulated cover according to an alternate embodiment.
Figure 9:
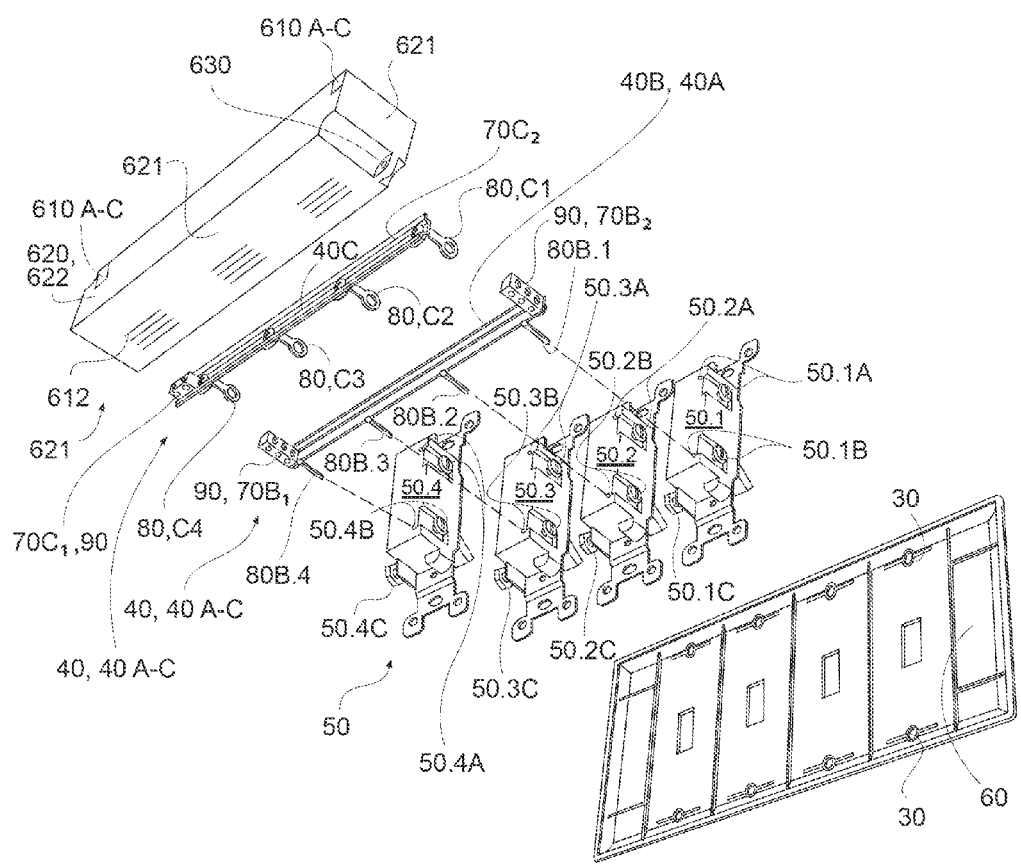
FIG. 9 is a back exploded perspective view of a ganged electrical switch fitting having an insulated cover according to an alternate embodiment.

Referring now to FIGS. 8 and 9, ganged composite electrical fitting 10.3 preferably includes cover plate 60, electrical receptacle components 50.1, 50.2, 50.3, 50.4, and electrical component cover, such as back cover 620 configured to cover and insulate one or more electrical receptacle components, such as 50.1, 50.2, 50.3, 50.4. Moreover, electrical receptacle components 50.1, 50.2, 50.3, 50.4 are configured as ganged duplex receptacle 140.3 having for example, hot terminal 50.1A, neutral terminal 50.1B, and ground terminal 50.1C electrically connected thereto one or more electrical terminals, such as terminal ends 70A, 70B, and 70C or quick-connectors 90.

For example in FIG. 9, neutral bus, such as neutral wire 40B preferably includes first end 70B1 and second end 70B2 (first neutral ends) and serial pins, taps or connectors, such as pin connectors 80B.1, 80B.2, 80B.3, 80B.4 (second neutral ends) and such pin connectors may be electrically connected to each electrical component 50 via neutral terminal 50.1B, 50.2B, 50.3B, 50.4B of electrical component 50.1, 50.2, 50.3, 50.4 respectively. Preferably ground bus, such as ground wire 40C preferably includes first end 70C1 and second end 70C2 (first ground ends) and serial pins, taps or connectors, such as loop connectors 80C.1, 80C.2, 80C.3, 80C.4 (second ground ends) and such loop connectors may be electrically connected to each electrical component 50 via ground terminal 50.1C, 50.2C, 50.3C, 50.4C of electrical component 50.1, 50.2, 50.3, 50.4 respectively.

Moreover for electrical switches, dimmers, or controllers as electrical receptacle component 50 (as shown in FIG. 6), duplex outlet 140.3 includes hot wire 40A.1/A.2/A.3/A.4 for electrical receptacle component 50.1, 50.2, 50.3, 50.4 respectively, and each may include first end 70A and second end 80A wherein each individual second end 80A (second hot wire end) is preferably electrically connected to one of electrical receptacle component 50.1, 50.2, 50.3, 50.4 via hot terminal 50.1A, 50.2A, 50.3A, 50.4A of electrical component 50.1, 50.2, 50.3, 50.4 respectively.

Moreover for electrical plug or receptacle as electrical receptacle component 50 (as shown in FIG. 7), duplex outlet 140.3 includes hot bus, such as hot wire 40A preferably includes first end 70B1 and second end 70B2 and serial pins, taps or connectors, such as pin connectors 80B.1, 80B.2, 80B.3, 80B.4 (second hot wire end) and such pin connectors may be electrically connected to each electrical component 50 via hot terminal 50.1A, 50.2A, 50.3A, 50.4A of electrical component 50.1, 50.2, 50.3, 50.4 respectively.

It is contemplated herein that connectors 80 (whether 80A, 80B or 80C or the like) may include a variety of connectors, such as pins, taps, tabs, spade, push-on, bullet, fork, ring, loop, bare wire (second end 80A) or the like to electrically connect one or more wire(s) 40, such as hot wire 40A, wire 40B, or ground wire 40C to hot terminal 50A, neutral terminal 50B, or ground terminal 50C of electrical receptacle components 50.1, 50.2, 50.3, 50.4.

It is further contemplated herein that one or more buses such as hot wire 40A, wire 40B, or ground wire 40C may be configured to be used interchangeably between hot terminal 50A, neutral terminal 50B, and ground terminal 50C. Moreover, bus or wire 40 such as hot wire 40A, wire 40B, or ground wire 40C may include one or more connectors 80 electrically connected thereto bus or wire 40 and spaced along bus or wire 40 to electrically connect to one or more electrical receptacle component 50. Additionally, bus or wire 40 may further include one or more quick-connectors 90 electrically connected to bus or wire 40 and electrically connected to one or more connectors 80, wherein quick-connectors 90 may be disposed anywhere along bus or wire 40.

Furthermore, cover plate 60 of composite electrical fitting 10.3 preferably includes electrical component cover, such as back cover 620 configured to cover and insulate one or more, part, portion or section of one or more, or all of electrical component 50, such as electrical receptacle components 50.1, 50.2, 50.3, 50.4 including hot terminal 50.1A, 50.2A, 50.3A, 50.4A neutral terminal 50.1B, 50.2B, 50.3B, 50.4B and/or ground terminal 50.1C, 50.2C, 50.3C, 50.4C of electrical component 50.1, 50.2, 50.3, 50.4. Preferably back cover 620 includes one or more holes, such as aperture 610 to enable wires 40, such as first end 70A of hotwire 40A, first end 70B of neutral wire 40B, and/or first end 70C of ground wire to transition in and out of back cover 620, as shown in FIG. 8. Furthermore, back cover 620 further includes one or more vents 612 configured to enable heat generated by electrical receptacle components 50.1, 50.2, 50.3, 50.4 to dissipate therefrom back cover 620 and/or composite electrical fitting 10.3.

Preferably, electrical fitting 10.3 further includes quick-connectors 90 (hot quick-connectors 90A, neutral quick-connectors 90B, and ground quick-connectors 90C), wherein quick-connectors 90 are disposed at first end 70A1, 70B1, and 70C1 and wherein quick-connectors 90 includes gripping members 100 and/or cutting members 110, wherein gripping members 100 are dimensioned to grip a selected size of wire and wherein cutting members 110 are dimensioned to cut through sheath H surrounding conductor C of insulated conductor I, thereby providing electrical communication between conductor C and a selected one of first end 70A, 70B, and 70C via wall hot wire 41A, wall neutral wire 41B, and wall ground wire 41C.

Preferably, back cover 620 includes three to four side panels 621 and rear panel 622 preferably configured in the shape of a rectangular box or the like shape configured to covered or insulate ganged duplex switches 140.3. Preferably apertures 610, such as apertures 610A-C may be positioned therein any of three to four side panels 621 or rear panel 622 to enable close proximity of quick-connectors 90, such as apertures 90A, 90B and 90C thereto insulated conductors I of power supply wiring G, such as wall hot wire 41A, wall neutral wire 41B, and wall ground wire 41C, respectively of wall box B of FIG. 3. Preferably back cover 620 may be affixed or removeably affixed thereto cover plate 60, such as by fastener, latch, screwed, adhesive, sonic weld, heat weld, or the like fastened there through connection hole 630 to form a covered and/or insulated ganged duplex switches 140.3 to increase the safety and to simplify wiring a set of electrical receptacle components 50.1, 50.2, 50.3, 50.4 thereto wall hot wire 41A, wall neutral wire 41B, and wall ground wire 41C of wall box B.

It is contemplated herein that ganged duplex switch 140.3 may contain any mix or combination of electrical component 50, such as electrical switch component 50 and/or electrical receptacle components 50 whether switch, receptacle, plug, outlet, fan switch, dimmer, or the like and any combination thereof electrical component 50.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A ganged electrical fitting, said ganged electrical fitting comprising:
    a cover plate having at least two sets of apertures, said at least two sets of apertures includes at least one throughhole and at least one component aperture;
    two or more electrical components affixed to said cover plate, each of said two or more electrical components fitted therein said at least one component aperture in said cover plate;
    integral wires, said integral wires having a neutral wire, a ground wire and at least one hot wire, said neutral wire having a first neutral end and a second neutral end, wherein said second neutral end is in electrical communication with each of said two or more electrical components and said ground wire having a first ground end and a second ground end, wherein said second ground end is in electrical communication with each of said two or more electrical components;
    and wherein said at least one hot wire having a first hot wire end and a second hot wire end, wherein said second hot wire end is in electrical communication with at least one of said two or more electrical components;
    and wherein said first neutral end is in electrical communication with a neutral quick-connector, said first ground end is in electrical communication with a ground quick-connector, and said first hot end is in electrical communication with a hot quick-connector;
    an electrical component cover affixed to said cover plate, said electrical component cover includes sides with a back fitted around said two or more electrical components; and
    a wall box having an opening, said opening having at least one receiving aperture, said wall box having at least one fastener positioned through said at least one throughhole of the cover plate and dimensioned to engage the at least one receiving aperture;
    wherein said ganged electrical fitting is removably secured to said wall box via said at least one fastener.

2. The ganged electrical fitting of claim 1, wherein said wall box further comprising at least one power supply wiring passing therethough into the wall box.

3. The ganged electrical fitting of claim 1, wherein said two or more electrical components includes a switch.

4. The ganged electrical fitting of claim 1, wherein said two or more electrical components includes a switch.

5. The ganged electrical fitting of claim 1, wherein said two or more electrical components includes an outlet.

6. The ganged electrical fitting of claim 1, wherein said two or more electrical components further comprises a group consisting of an outlet, a switch, a fan switch, a dimmer, a receptacle, and combinations thereof.

7. The ganged electrical fitting of claim 1, wherein said electrical component cover further comprises at least one opening for said integral wires to pass therethrough.

8. The ganged electrical fitting of claim 2, wherein said first neutral end, said first ground end, and said first hot end electrically connect with the corresponding said at least one power supply wiring from said wall box.

9. The ganged electrical fitting of claim 2, wherein said hot quick-connector connects to a wall hot wire of said at least one power supply wiring, where said neutral quick-connector connects to a wall neutral wire of said at least one power supply wiring, and where said ground quick-connector connects to a wall ground wire of said at least one power supply wiring.

10. The ganged electrical fitting of claim 1, wherein said electrical component cover includes a vent.

11. The ganged electrical fitting of claim 1, wherein said two or more electrical components affixed to said cover plate via a latch, a screw, a heat weld, or an adhesive.

12. A ganged electrical fitting, said ganged electrical fitting comprising:
    a cover plate having at least two sets of apertures, said at least two sets of apertures includes at least one throughhole and at least one component aperture;
    two or more electrical components affixed to said cover plate, each of said two or more electrical components selected from a group consisting of a switch, a receptacle, an outlet, a fan switch, a dimmer and combinations thereof, each of said two or more electrical components fitted therein said at least one component aperture in said cover plate;
    integral wires, said integral wires having a neutral wire, a ground wire and at least one hot wire, said neutral wire having a first neutral end and a second neutral end, wherein said second neutral end is in electrical communication with each of said two or more electrical components and said ground wire having a first ground end and a second ground end, wherein said second ground end is in electrical communication with each of said two or more electrical components;
    and wherein said at least one hot wire having a first hot wire end and a second hot wire end, wherein said second hot wire end is in electrical communication with at least one of said two or more electrical components;

and wherein said first neutral end is in electrical communication with a neutral quick-connector, said first ground end is in electrical communication with a ground quick-connector, and said first hot end is in electrical communication with a hot quick-connector;

an electrical component cover affixed to said cover plate, said electrical component cover includes sides with a back fitted around said two or more electrical components; and a wall box having an opening, said opening having at least one receiving aperture, said wall box having at least one fastener positioned through said at least one throughhole of the cover plate and dimensioned to engage the at least one receiving aperture;

wherein said ganged electrical fitting is removably secured to said wall box via said at least one fastener.

13. The ganged electrical fitting of claim 12, wherein said wall box further comprising at least one power supply wiring passing therethough into the wall box.

14. The ganged electrical fitting of claim 12, wherein said electrical component cover further comprises at least one opening for said integral wires to pass therethrough.

15. The ganged electrical fitting of claim 13, wherein said first neutral end, said first ground end, and said first hot end electrically connect with corresponding said at least one power supply wiring from said wall box.

16. The ganged electrical fitting of claim 13, wherein said hot quick-connector connects to a wall hot wire of said at least one power supply wiring, where said neutral quick-connector connects to a wall neutral wire of said at least one power supply wiring, and where said ground quick-connector connects to a wall ground wire of said at least one power supply wiring.

17. The ganged electrical fitting of claim 12, wherein said electrical component cover includes a vent.

18. The ganged electrical fitting of claim 12, wherein said two or more electrical components affixed to said cover plate via a latch, a screw, a heat weld, or an adhesive.

* * * * *